United States Patent Office 2,771,578
Patented Nov. 20, 1956

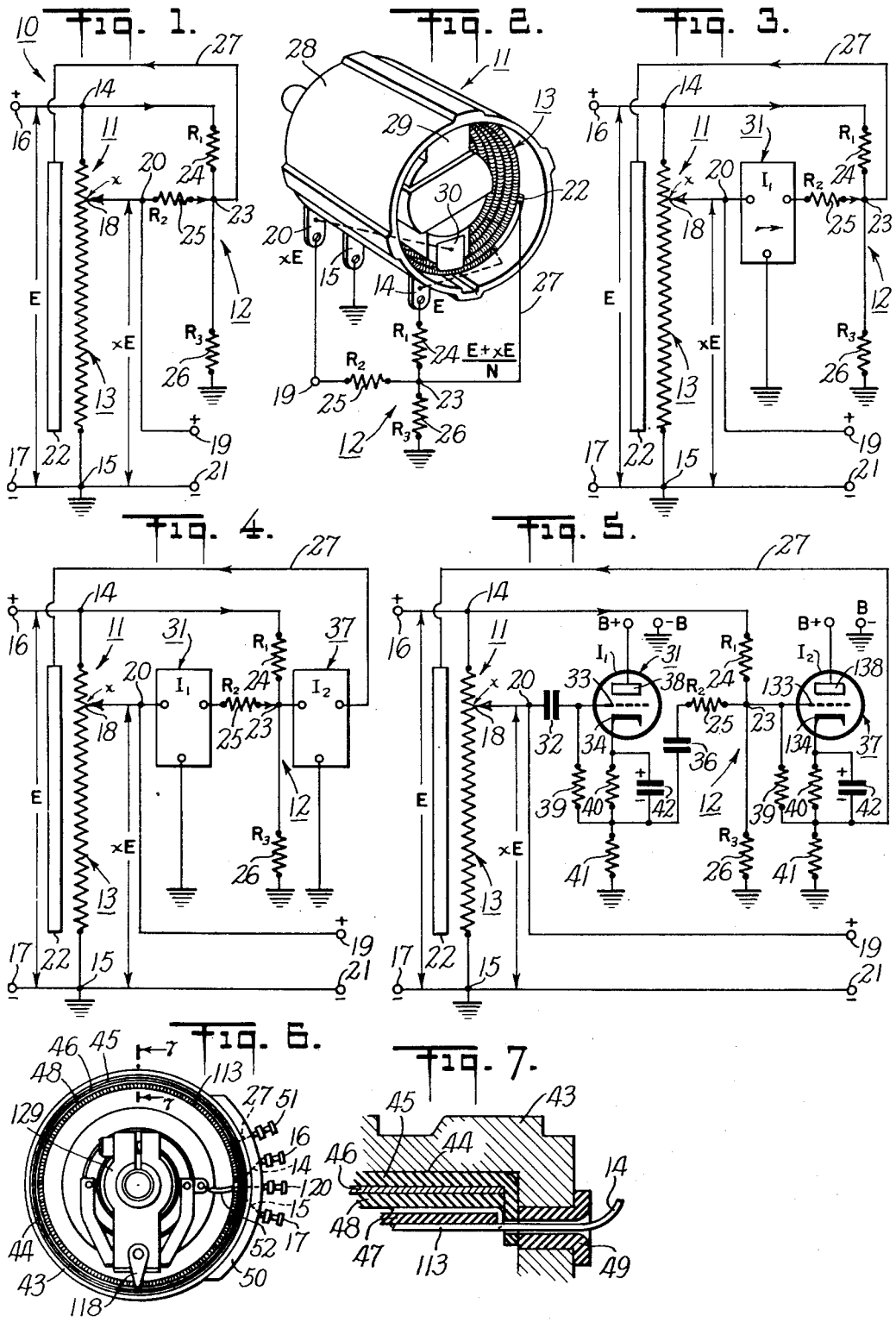

2,771,578

POTENTIAL DIVIDER COUPLING CIRCUITS

James L. West and Monson H. Hayes, Binghamton, N. Y., assignors to Link Aviation, Inc., Binghamton, N. Y., a corporation of New York Application January 11, 1954, Serial No. 403,400

21 Claims. (Cl. 323—79)

The present invention relates to coupling circuits characterized by potential dividers as voltage sources and, more particularly, to such circuits employing, for example, as the voltage sources, potentiometers and equivalent sources, and to a method of minimizing phase shift between input and output voltages thereof.

It has been observed that in the use of potential divider coupling circuits wherein the voltage source is in the form of a potentiometer, or similar device, characterized by an unconnected or floating conductive body in capacitive relation to the resistive means or winding of this voltage source, there is an undesirable shift in phase between the input voltage applied to the high end and reference (or grounded) end of the resistive means and the output voltage appearing between the output tap and this reference end. This phase shift is chiefly due to capacitive or displacement currents flowing between the resistive element and the conductive body, and the accompanying quadrature voltage at the output tap is undesirable for various systems. For example, such quadrature voltages seriously affect the accuracy of computations effected by apparatus which sums and multiplies voltages, such as analogue computers, since they may effect the computations from voltage components which are in exactly like or opposite phases. Such computers employ many such potential dividers in the form of sliding tap potentiometers and errors due to quadrature voltages are cumulative in the computed results. Also capacitive currents to a common reference side or ground may undesirably draw additional currents from the power supply and thus possibly impose needless loads on the potentiometers.

In potentiometers this floating conductive body may be in the form of either a spiralled metal mandrel or core about which the resistive element is wound, or a circular metallic shield or casing, between which and the resistive element the capacity is uniformly distributed. The resulting quadrature voltage contributes to the current in the potentiometer second order effects, and with the potentiometer resistance known and no capacitive loading assumed, the phase shift may be expressed by the following algebraic equation:

$$\phi(x) = \frac{wRC}{6}(x-1)(x+1-3M)$$

where $(x)$ is the position of the output tap or wiper contact, $(w)$ is $(2\pi)$ times the frequency in cycles per second, $(R)$ is the known resistance of the potentiometer resistance element and $(C)$ is the capacity between the resistance element and the conductive body. Also, $(M)$ is a number between zero and one—$(ME)$ being the potential of the conductive body and $(E)$ being the input voltage, and this $(ME)$ potential may not be fixed by direct connection as when the conductive body is floating.

In potentiometers where the conductive body may be grounded, such as in the form of a grounded metallic casing, the latter is at ground or reference potential and $(M)$ will be zero. In the latter case the phase shift may be expressed by the equation:

$$\phi(x) = \frac{wRC}{6}(x^2-1)$$

and it causes a maximum quadrature voltage to exist at output tap $(x)$ of $$\frac{wRC}{9\sqrt{3}}E \text{ at } x = \frac{1}{\sqrt{3}}$$

In the event that the conductive body is left floating as is common in some types of potentiometers, such as where the resistance wire is wound around a metallic mandrel or core as the conductive body, it will assume a potential of (1/2 E.) Then the variation of phase shift with displacement of the sliding or wiper output tap may be expressed by the equation:

$$\phi(x) = \frac{wRC}{6}(x^2 - 3/2x + 1/2)$$

causing a maximum quadrature voltage at $(x)$ of $$\left[1/2\left(1 \pm \frac{1}{\sqrt{3}}\right)\right]$$

having a magnitude of $$\frac{1}{12\frac{1}{\sqrt{3}}} \frac{2\pi f RC}{6} E$$

It is a general object of the present invention to minimize or substantially eliminate such prior art problems in a simple but efficient and practicable manner, and, more particularly, to provide apparatus for and a method of effectively driving such a conductive body at a potential which will minimize or reduce to zero such phase shift.

A more specific object of the present invention is to provide means for applying to such a conductive body a computed potential of $$EM = 1/3(1+x)E$$

whereby the first algebraic formula set fourth above for the phase shift at the output tap is caused to equal zero.

Another object of the present invention is to provide such a potential divider coupling circuit wherein the input voltage of the resistive element of the potential divider is added to the output voltage of the output tap, the sum divided by three, and the resulting voltage then applied to the conductive body in capacitive relation to the resistive element, effectively to eliminate quadrature voltage components. Thus, the use of such coupling circuits in analogue computers assures a desired accuracy in summing and multiplying computations effected by such devices.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

Fig. 1 is a schematic diagram showing a potential divider coupling circuit embodying one form of the present invention;

Fig. 2 is a perspective view of parts of a conventional type of potentiometer, diagrammatically showing other elements of apparatus of the Fig. 1 embodiment as connected thereto;

Fig. 3 is a schematic diagram of another embodiment of the present invention, one element thereof being depicted by block diagram;

Fig. 4 schematically shows, partly by block diagram, still another embodiment of the invention;

Fig. 5 is a schematic diagram of a circuit arrangement employing cathode followers as elements of the Fig. 4 embodiment;

Fig. 6 is an end view of another conventional type of potentiometer diagrammatically indicating terminal connections for use thereof in coupling circuits of the present invention; and Fig. 7 is an enlarged sectional detail, taken substantially on line 7—7 of Fig. 6.

Referring to the drawings, in which like numerals identify similar parts throughout, and more particularly, to Fig. 1, it will be seen that an embodiment of the present invention may consist of a potential divider coupling circuit 10 comprising, as a voltage source, a potential divider 11 and a summing and dividing network 12. The potential divider 11 may be in the form of a potentiometer having a resistive means in the form of a resistance element or winding 13 provided with a high end 14 and a reference or grounded end 15. Input terminals 16 and 17, between which the input voltage (E) is to be applied, are respectively connected to the high and reference ends 14 and 15. The potentiometer 11 includes an output tap 18, preferably in the form of a slider or wiper arm, such as a rotatable contactor, making contact with the resistance element 13 at, for example, point $x$. Although it may be preferred to employ, as the voltage source, a potentiometer as schematically illustrated at 11, it is understood that equivalent voltage sources, the use of which involves similar problems of quadrature potentials, as well as voltage dividers having one or more fixed output taps, may be employed in the practice of the invention. An output terminal 19 may be connected at 20 to the slider tap or wiper arm 18 and another output terminal 21 may be connected to the reference end 15 of the resistance element 13, which may be accomplished by grounding both. A conductive body 22 is located in capacitive relation to the resistance element 13 and, as has been pointed out above, may be commonly found in typical potentiometers, either in the form of a metallic mandrel or core about which the resistance element 13 is wound while being suitably insulated therefrom, or in the form of a metallic shield insulated from the winding.

In accordance with the teachings of the present invention, a summing and dividing network 12 is connected between the conductive body 22 on the one hand and the high and reference ends 13 and 15 of the winding 13 and the output tap 18 on the other hand. This summing and dividing network may, in its simplest form, as illustrated in Fig. 1, comprise three legs commonly connected together at junction point 23 with one leg connected through an impedance 24, preferably in the form of a resistor ($R_1$), to the high end 14 of the resistance element 13. Another leg of the network 12 includes an impedance 25, preferably in the form of a second resistor ($R_2$), connected to the output tap 18 at 20. The third leg of the network 12 includes an impedance 26, preferably in the form of a third resistor ($R_3$), connected to the reference end 15 of the potential divided winding 13, such as by being grounded. The junction point 23 of the network 12 is connected by a conductor 27 to the conductive body 22. As a practical matter, the resistances of ($R_1$), ($R_2$) and ($R_3$) should be large in comparison to the resistance of the potentiometer resistive means or winding 13.

As illustrated in Fig. 2, the potentiometer 11 may be of the type comprising a cylindrical casing or shell 28, carrying therein a spiraled metallic mandrel or copper core 22 about which is wound the resistance element or the turns thereof are disposed. The spiraled metallic mandrel or copper core 22 is thus located in capacitive relation to the winding 13. A rotor 29 is suitably rotatably supported in the casing 28 within the turns of the winding 13 and carries a wiper arm or sliding output tap 39 to traverse the resistance element. Normally, contact is made with the wiper 30 by a terminal carried by a cap to close the open end of the shell 28, illustrated in the forepart of Fig. 2, and contacting the end of the rotor 29; however, in order to avoid confusion in the showing of Fig. 2, such terminal 20 has been transferred to the rear portion thereof and, as is indicated by a dotted line, it is connected to wiper 30, and then through output terminal 19 to one end of the resistor 25. The terminal 14 is connected to one end of the winding 13 on the spiraled core 22 (as indicated by dotted line) for connection thereof to the resistor 24. A third terminal 15 is connected to the opposite end of the winding 13 for grounding the same, if desired. As illustrated in Fig. 1, the two resistors 24 and 25 are connected together at a junction point 23 and there to a third resistor 26, which may have, as shown, its other end grounded for connection to reference end 15 of the winding 13. The junction point 23 is connected by conductor 27 to the spiraled metallic mandrel or copper core 22.

When devices of the type schematically illustrated and shown in Figs. 1 and 2 are employed as potential divider coupling circuits with the input terminals 16 and 17 of each connected to a voltage source, the means or circuit to which its coupling circuit is to supply potential may be connected, for example, between the reference or ground terminal 15 and the output tap terminal 20, such as at 19. The potential (E) of the high end of the winding 13, as applied to the terminal 14, is added to the potential ($xE$) of the output tap at terminal 20 and the sum thereof is divided by a number approaching three (3), such number being indicated in Fig. 2 as (N). (N) will equal three (3) if the resistances of ($R_1$), ($R_2$) and ($R_3$) are equal and the other elements of the circuit are properly related by application of the derived voltage $$\left(\frac{E+xE}{N}\right)$$

to the conductive body 22 to eliminate phase shift between the input and output voltages, resulting from distributed capacity between the resistance element 13 and the conductive body 22 is reduced substantially to zero.

As a practical matter, it is desirable to insert between the output tap 18 and the summing and dividing network 12 a suitable isolating means, such as an isolating amplifier ($I_1$), illustrated in block diagram in Fig. 3 at 31, through which the output voltage ($xE$) is passed. Such isolating means 31 preferably has a gain of a theoretical value of unity and a high input impedance; it is desirable that the output impedance thereof be relatively low but this is not necessary. For this purpose, a cathode follower circuit has been found to be ideal for an alternating voltage embodiment of the present invention. As illustrated in Fig. 5, the measured portion ($xE$) of the potentiometer voltage (E) applied between terminals 16 and 17 is connected through a capacitor or fixed condensor 32 to the isolating means 31, or more specifically, cathode follower grid 33. The input signal applied to the cathode follower grid 33 causes cathode 34 to follow the input signal in phase and magnitude and the quite high input impedance of the cathode follower assures that negligible current will be drawn to drive it. A substantial replica of the voltage ($xE$) applied through the capacitor 32 from the potentiometer output tap 18 to the cathode follower grid 33 is delivered by the output conductor 35 through another capacitor 36 to one end of the resistor ($R_2$) of the summing and dividing network 12. Theoretically, voltage supplied to the resistor ($R_2$) from the cathode follower isolating means 31 cannot precisely equal the input voltage ($xE$) applied to the grid 33 from the wiper or output tap 18, but if the gain of the cathode follower isolating means is high and approaches unity as close as possible, those voltages will be approximately equal.

As illustrated in Fig. 4, another embodiment of the present invention may be characterized by insertion of a second isolating means ($I_2$), illustrated by block diagram at 37, between the junction point 23 of the summing and dividing network 12 and the conductive body 22. As proposed in Fig. 5, such second isolating means ($I_2$) may be in the form of a second cathode follower 37 inserted in the conductor 27 supplying the derived voltage $$\left(\frac{E+xE}{N(or\ 3)}\right)$$

The voltage derived from the network 12 at the junction point 23 is supplied to the grid 133 of the second cathode follower 37 and the cathode 134 is caused to follow it in phase and magnitude. Negligible current is drawn to drive cathode follower 37 due to its very high input impedance and thus a substantial replica of the derived voltage from the network 12 is supplied by conductor 27 to the conductive body 22.

Such means to add passively to the excitation voltage ($E$) the output of the first stage cathode follower 31 may be thus employed to drive the conductive body 22 in capacitive relation to the potentiometer winding 13 substantially at a derived voltage of $$\left(\frac{E+xE}{3}\right)$$

if a cathode follower of reasonably high performance characteristic is employed, such as in the form of a double triode miniature tube and associated resistors and condenser, or in the form of two suitable triodes. However, since the gain of such a cathode follower stage does not, at its theoretical best, quite approach unity, correction therefor may be readily attained by providing resistors ($R_1$) and ($R_3$) at 24 and 26, which are of resistances somewhat higher than the resistance of resistor ($R_2$) at 25. For example, an embodiment of the present invention, as schematically illustrated in Fig. 5, has been devised to attain in an efficient manner the objects of the present invention with application to the conductive body of a derived voltage $$\left(\frac{E+xE}{3}\right)$$

with the use in the coupling circuit of elements having the following ratings. The fixed capacitor at 32 had a rating of 400 v. and 1.0 μfd. The tube in stage 31 was a double triode miniature 12AT7 to the plate 38 of which was supplied 300 v. D. C. Resistor 39 had a resistance of 1.0 MΩ. Resistor 40 had a resistance of 1.5 kΩ and the resistor at 41 had a resistance of 30 kΩ. The capacitor 42 had a capacitance of 150 μfd. at 6 v. The capacitor at 36 had a capacitance of 10 μfd. at 200 v. D. C. The summing and dividing network resistor ($R_2$) at 25 had a resistance of 10 kΩ, while resistors ($R_1$) and ($R_3$) at 24 and 26 each had a resistance of 10.5 kΩ. The cathode follower and associated elements in the second stage 37 were of like ratings. With an assumed impedance of the cathode follower tube in the first stage 31 of 500Ω and with the summing resistor ($R_2$) having a resistance of 10 kΩ, it was found that the theoretical value of the derived voltage $$\left(\frac{E+xE}{3}\right)$$

could be attained for driving the conductive body at that potential to eliminate quadrature voltage components with zero phase shift when the other two summing resistors ($R_1$) and ($R_3$) each had a resistance of about 10.5 kΩ. The impedance of the 10 μfd. blocking condenser between the two stages was negligible. Circuit elements having the above specified values were found to be effective in preventing, or materially reducing, phase shift in potentiometers having resistance values ranging from 0–20,000 Ω to 0–200,000 Ω. Of course, as proposed in Figs. 6 and 7, the potentiometer employable to advantage in coupling circuits of the present invention may be of another well-known conventional type wherein the casing is in the form of a metallic cup 43 which normally is grounded and has a cylindrical recess 44 therein. Within the recess 44 is disposed a facing of insulation 45 within the cylindrical side wall of which is seated a metallic band or cylindrical shield 46. The winding 113 is in the form of turns of resistance wire wound upon a cylindrical band 47 of insulation, and the turns of the winding are insulated from the shield 46 by another cylindrical band 48 of insulation. Preferably, rubber grommets are employed to bring out the terminals of the winding through the casing, such as that proposed at 49 in Fig. 7 for the end 14 of the winding. As indicated in Fig. 6, terminal end 14 (indicated in dotted lines) is connected to terminal 16 and the other terminal end 15 is connected to a like terminal 17 suitably supported on an insulating base 50 on the side of the cup 43. Since the shield 46 serves as the conductive body located in capacitive relation to the winding 113, it is connected by suitable conductive means 27 (indicated in dotted lines) to a terminal 51 for connection to the junction point of the summing and dividing network, such as that illustrated at 12 in the other figures of the drawing.

In the embodiment illustrated in Figs. 6 and 7, a suitable rotor 129 is rotatably supported in the shell 43 and carries a wiper arm structure including a sliding tap 118 which slides in contact with the outer end turns of the winding 113 with rotation of the rotor. A conductor 52 connects sliding tap 118 with a terminal 120 which is to be connected to the input of the summing and dividing network 12 of the present invention, either directly to the resistor ($R_2$) thereof or to that resistor through an isolating means such as that illustrated at 31.

It is contemplated within the scope of the present invention to employ as isolating means, in lieu of the AC stage cathode follower 31, other equivalent means which will permit similar functioning of the coupling circuits, such as, for example, a conventional direct current isolating and amplifying feedback circuit, as will be understood by those skilled in the art. Such equivalency is further remarked in the copending application of Monson H. Hayes, Serial No. 397,516, filed December 11, 1953. It is also to be understood that the term "potential divider" as employed herein in designation of the voltage source of the coupling circuit of the present invention is employed in its broadest sense to include within the scope of the meaning thereof all devices equivalent to fixed tap voltage dividers and potentiometers wherever associated elements and the particular service permit the employment thereof. For example, it may be possible to employ as the voltage source of a coupling circuit of the present invention for a certain service an autotransformer or the like. Further, the conductive body which is located in capacitive relation to the resistive means to cause phase shift, in absence of its driving at a derived voltage in accordance with the teachings of the present invention, may be in the form of normal shielding means, etc.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A coupling circuit comprising as a voltage source a potential divider having impedance means and a conductive body located in capacitive relation to said impedance means, and a summing and dividing network connected between said voltage source and said conductive body to minimize phase shift between said impedance means and said conductive body.

2. A coupling circuit comprising as a voltage source a potential divider having resistance means and a conductive body located in capacitive relation to said resistance means, isolating means connected to receive voltage of said voltage source, and a summing and dividing network connected between said isolating means and said conductive body to minimize phase shift between said resistance means and said conductive body.

3. The coupling circuit as defined in claim 2 characterized by said isolating means as having a gain approaching unity and a relatively high input impedance.

4. The coupling circuit as defined in claim 2 characterized by said isolating means being an isolating amplifier of the cathode follower type.

5. A coupling circuit comprising, in combination, a voltage source in the form of a potential divider having a resistance element and a conductive body located in capacitive relation to said resistance element, isolating means having input means connected to receive voltage from said voltage source and output means, a summing and dividing network connected to said output means, and other isolating means interposed between said network and said conductive body to minimize phase shift between said resistance element and said conductive body.

6. The coupling circuit as defined in claim 5 characterized by said first isolating means having a gain approaching unity and a relatively high input impedance.

7. The coupling circuit as defined in claim 6 characterized by said first isolating means being a cathode follower.

8. The coupling circuit as defined in claim 7 characterized by both of said isolating means being cathode followers.

9. A coupling circuit comprising as a voltage source a potential divider having resistance means provided with an output tap and a conductive body located in capacitive relation to said resistance means; and a summing and dividing network connected between said output tap and said conductive body and comprising three legs commonly connected together with one leg including impedance means connected to the high end of said potential divider resistance means, another leg thereof including a second impedance means connected to said output tap and the third leg thereof including a third impedance means connected to the reference end of said potential divider resistance means.

10. The coupling circuit as defined in claim 9 characterized by the provision of the impedance means in said three legs of said summing and dividing network as resistors.

11. The coupling circuit as defined in claim 10 characterized by the resistances of said resistors being substantially equal in said three legs.

12. The coupling circuit as defined in claim 9 wherein the voltage applied to said conductive body is substantially $$\left(\frac{E+xE}{3}\right)$$

where (E) is the potential of the high end of said potential divider resistance means and (xE) is the potential of said output tap thereof relative to the reference end.

13. Apparatus for minimizing phase shift between input and output voltages of potentiometers and the like having a conductive body in capacitive relation to the winding thereof comprising; in combination with the winding, its high and reference ends and an output tap, of a summing and dividing network of impedances connected between said conductive body on one hand and the high and reference ends of the winding and the output tap on the other hand.

14. The phase shift minimizing apparatus of claim 13 characterized by said summing and dividing network as comprising resistors having one end of each commonly connected together at a junction with the latter being connected to said conductive body, one of said resistors having its other end connected to the high end of said winding, another of said resistors having its other end connected to the reference end of said winding, and a third of said resistors having its other end connected to said tap.

15. A method of reducing or eliminating quadrature voltage components from a potential divider coupling circuit output comprising adding to the input voltage the voltage of an output tap thereof, dividing that sum by a number approaching three (3), and applying the derived voltage to a conductive body located in capacitive relation to the resistive element of the potential divider.

16. A method of eliminating phase shift between the output voltage (xE) at the sliding output tap (x) of a potentiometer and the input voltage (E) applied to the resistive element of the latter comprising summing the input and output voltages, dividing the sum by three (3), and applying the derived voltage $$\left(\frac{E+xE}{3}\right)$$

to a conductive body located in capacitive relation to the resistive element.

17. A coupling circuit comprising as a voltage source a potentiometer having a resistance element with a high end and a grounding end, a sliding output tap for said resistance element, and a conductive body located in capacitive relation to said resistance element; a cathode follower having a gain approaching unity and a relatively high input impedance connected to said output tap; a summing and dividing network comprising three legs commonly connected together at a junction point with one leg including a resistor connected to said cathode follower, another leg thereof including a second resistor connected to said high end of said resistance element and the third leg thereof including a third resistor connectable to the reference end of said resistance element; and means connecting the junction point of said network to said conductive body.

18. A coupling circuit comprising as a voltage source a potentiometer having a resistance element with a high end and a grounding end, a sliding output tap for said resistance element, and a conductive body located in capacitive relation to said resistance element; a cathode follower having a gain approaching unity and a relatively high input impedance connected to said output tap; a summing and dividing network comprising three legs commonly connected together at a junction point with one leg including a resistor connected to said cathode follower, another leg thereof including a second resistor connected to said high end of said resistance element and the third leg thereof including a third resistor connectable to the reference end of said resistance element; and isolating means connecting the junction point of said network to said conductive body.

19. A coupling circuit comprising as a voltage source a potentiometer having a resistance element with a high end and a grounding end, a sliding output tap for said resistance element, and a conductive body located in capacitive relation to said resistance element; a cathode follower having a gain approaching unity and a relatively high input impedance connected to said output tap; a summing and dividing network comprising three legs commonly connected together at a junction point with one leg including a resistor connected to said cathode follower, another leg thereof including a second resistor connected to said high end of said resistance element and the third leg thereof including a third resistor connectable to the reference end of said resistance element; and a second cathode follower connected between said junction point of said network and said conductive body.

20. A variable electrical potential divider comprising an impedance element, a rotatable contactor engageable with different portions of said impedance element as said contactor is rotated, a shaft for imparting rotation to said contactor, a conductive body in said potential divider capacitively coupled to said impedance element through close proximity thereto but insulated therefrom, a pair of electrical connector terminals on said potential divider, said terminals conductively connected with opposite ends of said impedance element, a third connector terminal on said potential divider insulated from said pair of terminals but conductively connected with said rotatable contactor, and a fourth connector terminal insulated from said first three terminals but electrically connected with said conductive body.

21. A variable electrical potential divider comprising a resistance element wound upon an insulated body, a rotatable contactor engageable with different portions of said resistance element as said contactor is rotated, a shaft for imparting rotation to said contactor, a conductive body in said potential divider insulated from said resistance element but capacitively coupled therewith through close proximity thereto, a first pair of electrical connector terminals on said potential divider conductively connected to opposite ends of said resistance element, a second pair of connector terminals, means connecting one terminal of said second pair with said rotatable contactor, and means connecting the other terminal of said second pair with said conductive body.

References Cited in the file of this patent

UNITED STATES PATENTS

| | | |
|---|---|---|
| 2,493,199 | Khouri et al. | Jan. 3, 1950 |
| 2,606,984 | Burgess | Aug. 12, 1952 |
| 2,619,570 | Takats | Nov. 25, 1952 |
| 2,677,098 | Pike et al. | Apr. 27, 1954 |